United States Patent [19]
Ott et al.

[11] Patent Number: 6,047,245
[45] Date of Patent: Apr. 4, 2000

[54] RESISTIVE STRAIN GAUGE CONTROL CIRCUIT

[75] Inventors: William B. Ott, Apex, N.C.; Gary E. Webb, Cumming, Ga.

[73] Assignee: International Business Machines Corporation, Armonk, N.Y.

[21] Appl. No.: 09/002,521

[22] Filed: Jan. 2, 1998

[51] Int. Cl.[7] .......................... G01G 19/00; G01C 25/00
[52] U.S. Cl. .................. 702/104; 702/101; 702/102; 177/25.14; 177/210 R; 177/210 C
[58] Field of Search .................... 702/42, 101, 102, 702/104, 107; 177/25.13, 25.14, 210 R, 210 C, 210 EM

[56] References Cited

U.S. PATENT DOCUMENTS

| | | | |
|---|---|---|---|
| 3,916,173 | 10/1975 | Williams, Jr. et al. | 702/101 |
| 4,080,657 | 3/1978 | Caldicott et al. | 702/101 |
| 4,760,539 | 7/1988 | Amacher et al. | 702/101 |
| 4,917,199 | 4/1990 | Loshbough | 177/210 C |
| 5,308,931 | 5/1994 | Griffen | 177/25.14 |
| 5,633,811 | 5/1997 | Canada et al. | 702/190 |
| 5,832,417 | 11/1998 | Petrucelli et al. | 702/102 |
| 5,886,302 | 3/1999 | Germanton et al. | 177/210 R |

*Primary Examiner*—Marc S. Hoff
*Assistant Examiner*—Bryan Bui
*Attorney, Agent, or Firm*—Bernard D. Bogdon

[57] ABSTRACT

A resistive strain gauge bridge circuit, including a pulse code modulation counter operative under an algorithm designed for calibration with a voltage signal for effectively canceling out voltage and voltage fluctuation influences to maintain centering of the operating point of the strain gauges without the excessive costs attributable to devices such as electronic potentiometers which notably have been utilized to generally achieve satisfactory performance of strain gauges included in mobile personal computer systems.

5 Claims, 5 Drawing Sheets

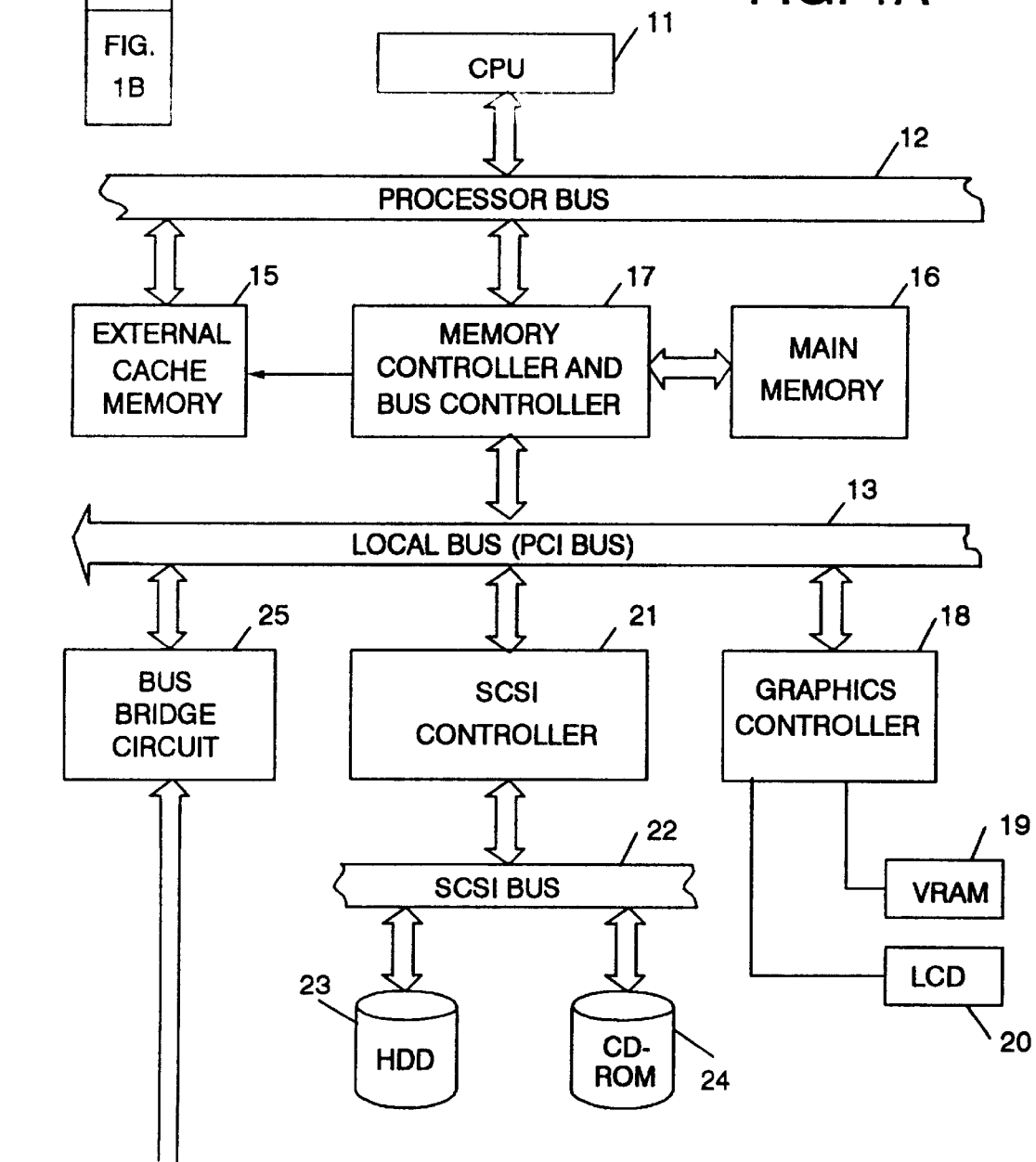

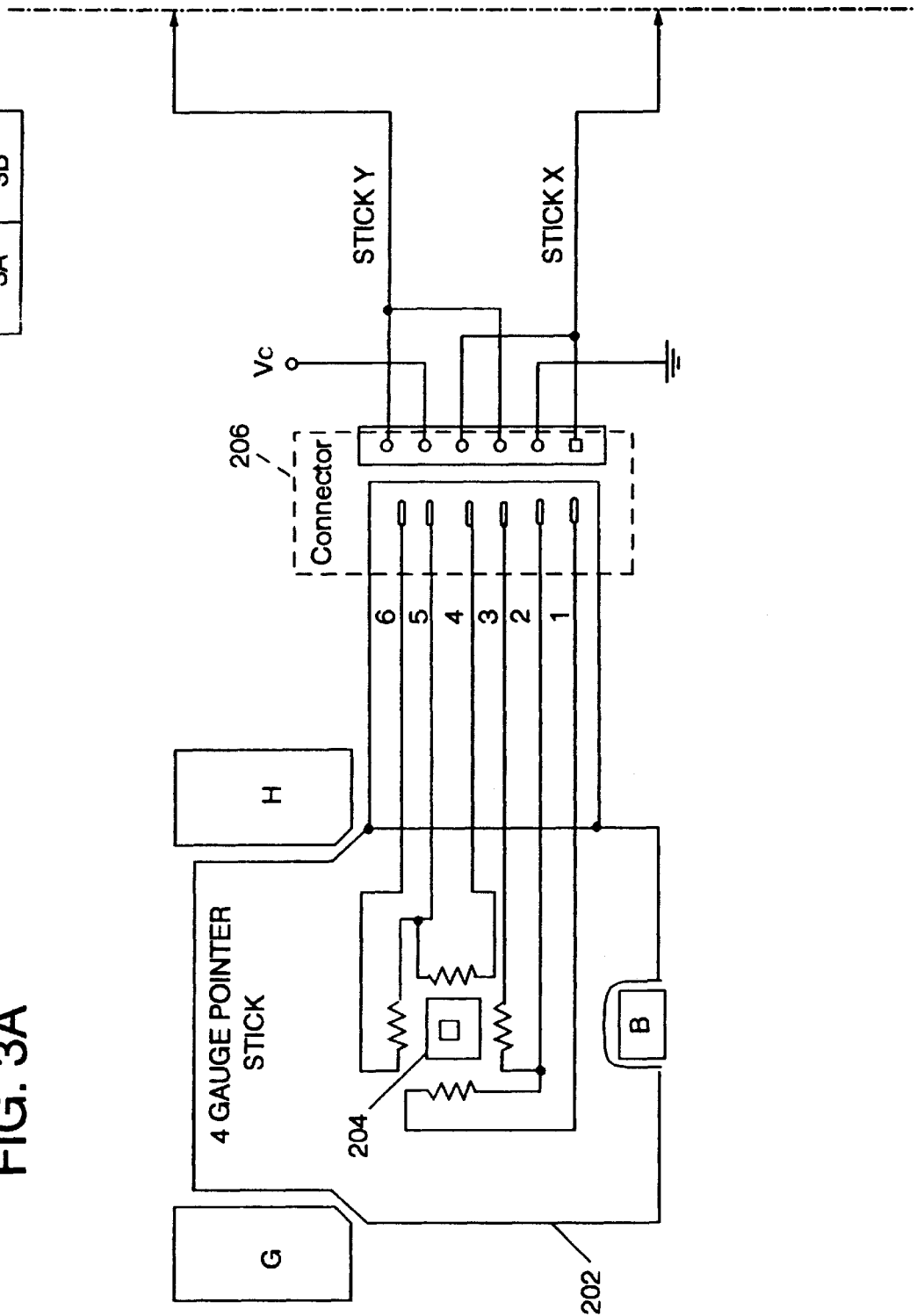

6,047,245

RESISTIVE STRAIN GAUGE CONTROL CIRCUIT

FIELD OF THE INVENTION

This invention relates generally to strain gauge circuitry for use with force transducers and, more particularly, to resistive strain gauge VLSI circuitry operative under an algorithm which maintains the operating point of the strain gauges and is not readily susceptible to voltage fluctuations, particularly for use in personal computers, including the keyboards of notebook computers.

BACKGROUND OF THE INVENTION

Force transducers for control actuators convert external forces applied to the actuator by a user into corresponding electrical signals that are used to control a device or position an object of a display. The external forces are converted into electrical signals that represent force components along orthogonal axis. For example, a joystick type display controller for a computer includes a force transducer that converts forces applied to the joystick into two signals, one signal representing the component of force along an X axis and a second signal representing the component of force along a Y axis that is orthogonal to the X axis. The relative magnitude of the X and Y signals represent that relative amount of display pointer movement along the X and Y axis desired by the user. A computer to which the display controller is attached receives the electrical signals and moves the display pointer accordingly. The force transducer of the display controller is provided with electrical power and generates the electrical signals representing the force components as the external force is applied.

The joystick type display controller described above can include a force transducer comprising a lever arm that is mechanically coupled to a support base by an articulated joint. While the force transducer provides the needed force component electrical signals, the mechanical linkage needed to permit movement of the joystick in the desired directions is complex. In particular, the mechanical linkage is relatively large, bulky, and expensive. Also, the mechanical linkage is subject to wear and reliability problems.

As an alternative to the joystick force transducer with a mechanical linkage, force transducers have been developed with thin film resistive strain gauges. A thin film resistive strain gauge uses a conductive, thin film resistive strain gauge material that is deposited onto a thin flexible substrate using photo lithographic fabrication techniques. The strain gauge material undergoes a change in electrical resistivity when the underlying substrate is subjected to strain. If an electrical current is passed through the strain gauge material, the change in resistivity can be detected by an output voltage change and the relative amount of strain can be measured. Typically the substrate undergoes strain when forces are applied to the lever arm.

For example, the IBM Corporation ThinkPad™ 750 laptop computer is provided with a display controller force transducer comprising a pointer actuator that extends upwardly from a location between keys of the computer keyboard between the left and right hands of a computer user when such hands are resting at the keyboard home position. As forces are applied to the lever arm, the strain is detected and is used to control a display point on a monitor or display unit. This permits a user to control the associated display pointer without removing his or her hands from the keyboard. The user's hands otherwise would need to move from the keyboard to manipulate, for example, a display mouse controller or joystick controller.

The IBM Corporation Track Point™ system incorporated into, for example, the IBM Corporation ThinkPad™ computer consists of a set of strain gauges in a balanced bridge. By their nature the strain gages produce very small signals which is a function of the physical properties of the selected materials and the geometry utilized. Those signals must be amplified on the order of 300 times (300×) to be satisfactorily used in the TrackPoint system. With such large amplification, the direct current (DC) offset from the bridge, as well as any amplifier drift must be corrected in order to keep the input signal "centered" in the linear range of the amplifier. To accomplish this, the systems frequently use a relatively expensive electronic analog potentiometer that is adjusted periodically by the track point controller.

SUMMARY OF THE INVENTION

For systems and circuits that use a relatively expensive electronic potentiometer to maintain the operating point of the system strain gauges, this innovation describes an inexpensive alternative that provides improved control. This invention describes a circuit that avoids the need for use of a potentiometer and replaces such a device with simpler, less expensive digital logic and analog filtering. As such, the circuit can be implemented in VLSI more readily and in an easier manner.

DETAILED DESCRIPTION OF THE INVENTION

Figure 1B:
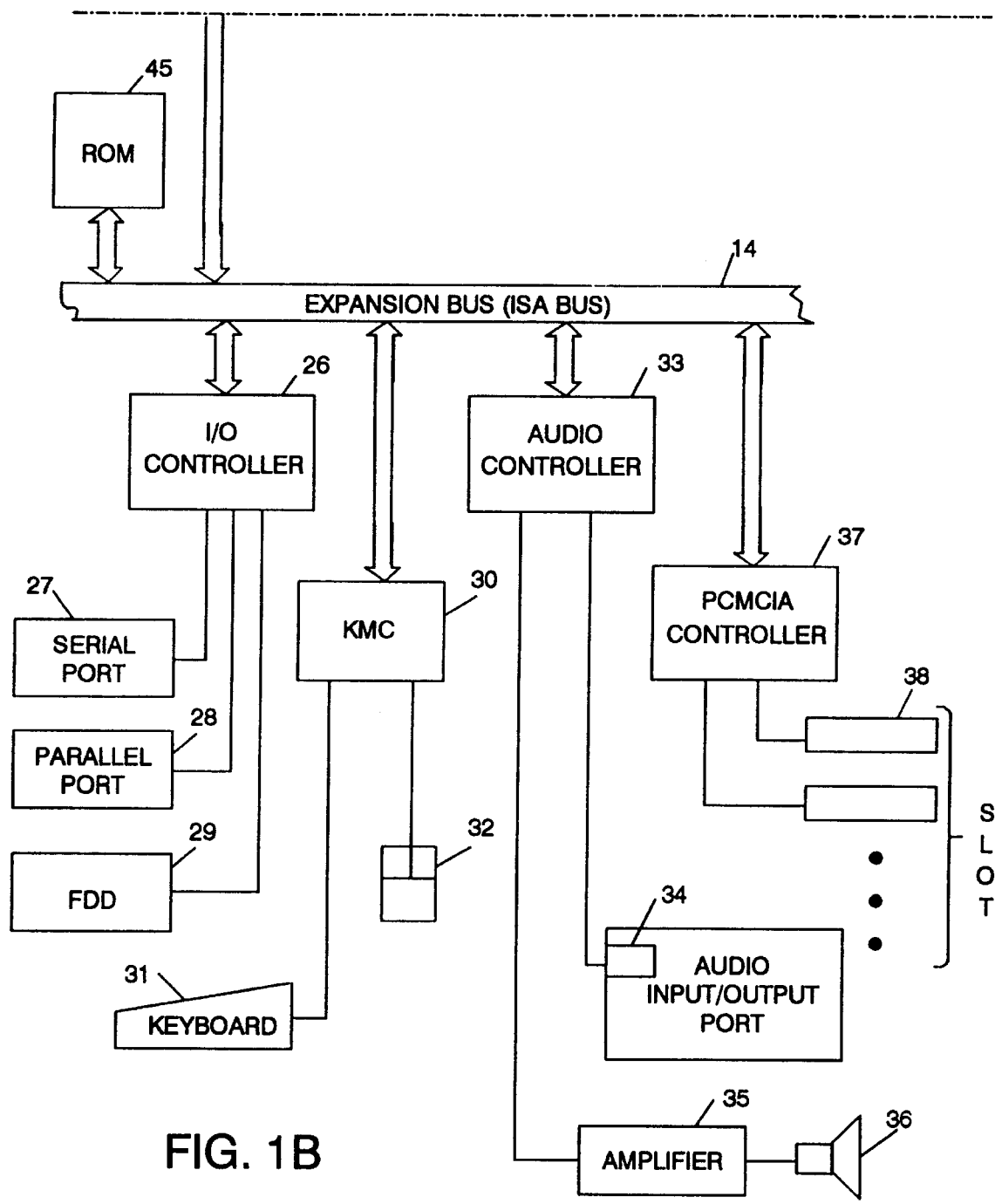
FIG. 1 is comprised of FIGS. 1A and 1B which illustrate a schematic block diagram of a typical notebook computer into which the principles of the presentation can be incorporated.

FIG. 1 is a schematic block diagram illustrating the hardware arrangement of a notebook computer suitable for incorporating an embodiment of the present invention. The computer system supports, for example, a three-layer bus architecture that includes a processor bus 12, a local bus 13, and an expansion bus 14 to enable to CPU 11 to communicate with individual input/output devices. The processor bus 12, a high-speed bus that employs an external signal from the CPU 11, is employed principally for communication with an external cache memory 15 and a main memory 16. The external cache memory 15 is a memory in which data and commands that are frequently used are temporarily stored. Generally, a high-speed memory, such as SRAM, is employed as the external cache memory 15. The main memory 16 is employed for loading therein basic software, such as an operating system (OS), and application programs, and for being used as a work area for the CPU 11. DRAM is ordinarily used for the main memory 16.

The processor bus 12 communicates with the local bus 13 via a bus controller 17. The bus controller 17 incorporates circuitry to exchange signals as an intermediary between different architectures and functions as a buffer by absorbing the difference in the transfer speeds of the processor bus 12 and the local bus 13. The functions of the bus controller 17 can be constituted by one chip that includes a memory controller.

A Peripheral Component Interconnect (PCI) bus with a relatively high data transfer speed is employed as the local bus 13. Input/output devices, such as a graphics controller 18 and SCSI controller 21, for which high throughput is required, are connected to the local bus 13.

The graphics controller 18 is a peripheral LSI for performing the graphic processing of a graphic command that is received from the CPU 11. A VGA device is an example of such a controller. The VRAM 19 is a screen buffer for temporarily storing graphic information that is being processed. A liquid crystal display device (LCD) 20 actually displays the contents of the VRAM 19.

The Small Computer System Interface (SCSI) controller 21 is an LSI for SCSI control, and serves as an initiator of commands that are carried on the SCSI bus 22. Input/output devices (e.g., various storage devices such as an HDD 23 and a CD-ROM 24) that have an SCSI interface are connected to the SCSI bus 22.

One end of the local bus 13 can be connected to a bus connector for external expansion. The expansion bus 14, that is located at the lowest layer level, communicates with the local bus 13 via a bus bridge circuit 25. The expansion bus 14 is employed to connect input/output devices for which very high throughput is not required, and an Industrial Standard Architecture (ISA) bus, for example, is used. Connected to the expansion bus 14 are an I/O controller 26, a keyboard/mouse controller (KMC) 30, an audio controller 33, a Personal Computer Memory Card Interface Association (PCMCIA) controller 37, and a ROM 45. The bus bridge circuit 25 can be designed so that an interrupt controller, a DMA controller, and a system timer are provided on a single chip. The interrupt controller provides monitoring of specific signals on the local bus 13. When an interrupt originates at any of the input/output devices on the local bus 13, the interrupt controller detects it and informs the CPU 11 and more specifically, a BIOS that the CPU 11 executes.

The I/O controller 26 is a peripheral LSI for controlling the timing for data transfers between the expansion bus 14 and various input/output devices (e.g., a modem and a printer), which are connected via a serial port 27 and a parallel port 28, or an auxiliary storage device such as a floppy disk drive (FDD) 29.

The KMC 30 is a peripheral LSI for processing an input matrix through a keyboard 31 and coordinate input by a mouse 32. The keyboard 31 is ideally suited for incorporating the present invention.

The audio controller 33 is a peripheral LSI for handling the input and output of audio signals. In the illustration of FIG. 1, the audio controller 33 exchanges an audio signal via an audio input/output port 34 and outputs sound at a loudspeaker 36 via an amplifier 35.

The PCMCIA controller 37 is an interface circuit for enabling the exchange of data between the PCMCIA card and the ISA bus 14. One or more slots 38, into which a PCMCIA card can be inserted, are provided on the local side of the PCMCIA controller 37.

The ROM 45 is a nonvolatile read only memory to which data are written as is determined during the manufacturing process. The ROM 45 provides for the permanent storage of procedures that are employed with the computer system is powered on (e.g., power-on self test (POST)) and the codes for the program (basic input/output system (BIOS)) for the operating of the internal hardware of the system 10.

Actually, the notebook computer comprises many interface circuits and input/output devices other than those shown in FIG. 1. It would be understood by one having ordinary skill in the art that for convenience sake unnecessary hardware components are omitted in this specification.

The IBM TrackPoint system uses two identical circuits, one to control the "X" axis and one to control the "Y" axis. Without loss of generality, what is described herein for the present invention, in particular for FIG. 1, represents one axis. Other axis can be similarly structured and have corresponding functions.

Figure 2:
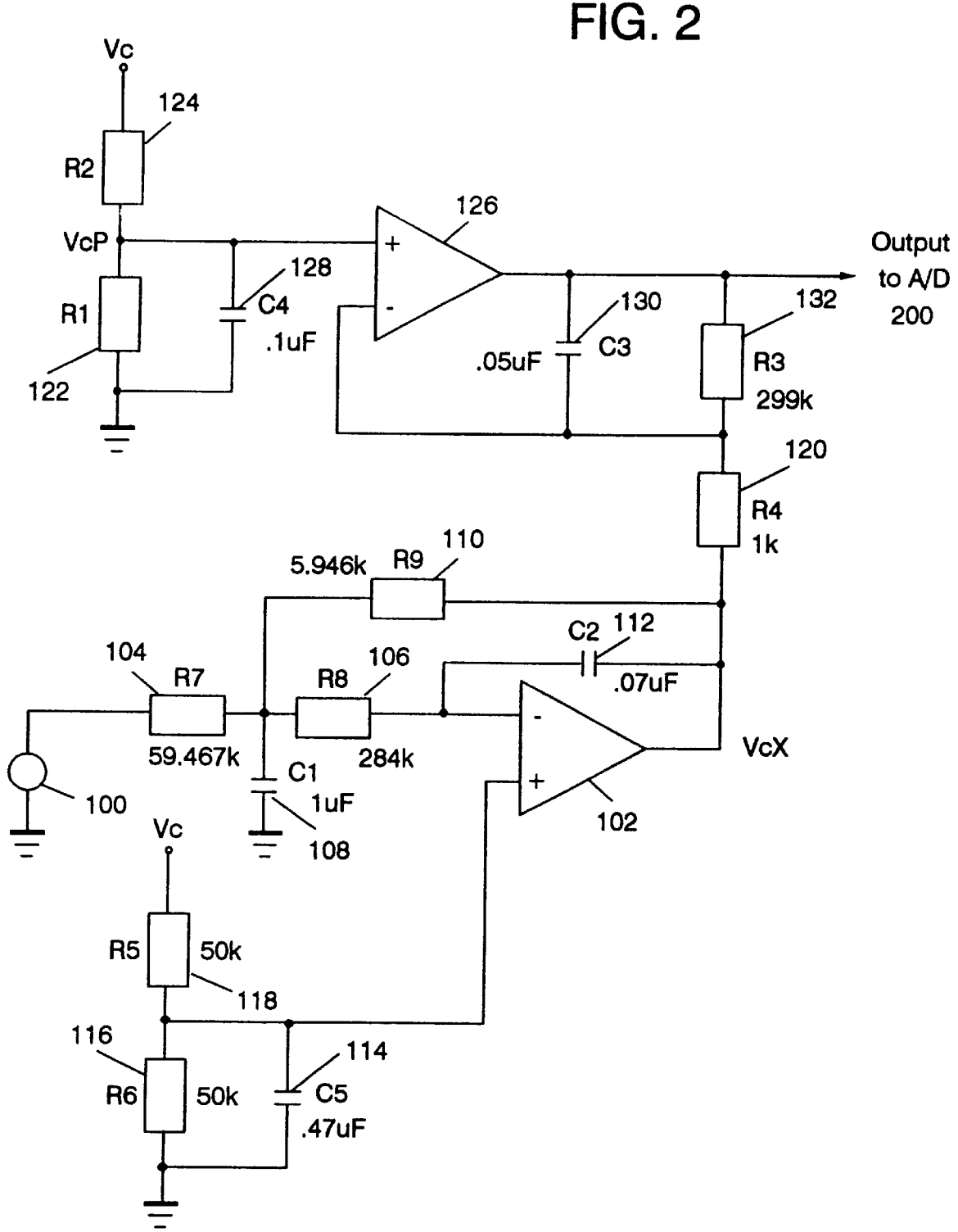
FIG. 2 is a schematic block diagram of the resistive strain gauge circuitry of one geometric axis of a system for tracking on the screen of a monitor according to the principles of the present invention.

In FIG. 2, there is a pulse code modulation (PCM) counter 100. It produces a fixed frequency digital signal where the ratio of the up-time and the fixed period (inverse of the fixed frequency) is proportional to a provided count loaded into the counter 100. For example, if the maximum count is 1,000, then entering a count of 500 produces an up-time that is 50% of the period or a square wave.

Amplifier 102 and the resistor/capacitor network surrounding it, form a third order, maximally flat group delay filter that reduces the non-linearity resulting from different counts being applied to the PCM counter 100. The term "third order" filter, as it applies to low pass filters, refers to the number of poles (points) in the denominator of the filter equation where the denominator approaches 0 in the limit. It functions to determine how fast the filter reduces the amplitude of an AC signal measured in decibels per octave or decade of frequency, outside the band pass of the filter. As illustrated, resistive device (R7) 104 is connected from counter 100 through a resistive device (R8) 106 to the negative input of amplifier 102. A capacitive device (C1) 108 is connected from ground through the common connection of resistive devices 104 and 106 through a resistive device (R9) 110 to the output of the amplifier 102. Connected between the minus and output terminals of amplifier 102 is a capacitive device (C2) 112. The positive input terminal of amplifier 102 is connected through capacitive device (C5) 114 and resistive device (R6) 116, which are respectively connected in parallel, to ground. The positive input of amplifier 102 is connected to voltage source Vc through resistive device R5 118. The voltage VcX at the output of amplifier 102 is applied to resistive device (R4) 120.

In FIG. 2 resistive devices (R1) and (R2), 122 and 124 respectively, connect together at the positive input of amplifier 126. The voltage Vc is applied at resistive device 124, whereas resistive device 122 is connected to ground and to capacitive device (C4) 128 which connects to the positive side of amplifier 126. The bridge formed by resistive devices 122 and 124 comprise one axis of the strain gauge. Connected across the amplifier 126 from the negative input to the output is a parallel circuit of a capacitive device (C3) 130 and a resistive device (R3) 132. The output of the amplifier 126 is applied to an A/D converter 200 which is shown in the block diagram of FIG. 3B.

The 3 dB point was set to 10 Hz to ensure minimal error and maximum filtering from the fixed period (1 ms or 1 kHz frequency) of the PCM 100. The 3 dB point or "break point" of a filter is the point at which the filter is rejecting halve the signal, as measured by power, not amplitude. The amplitude is actually down 6 db when the power is down 3 db. By convention, this is called the 3 db point. The gain was selected to account for the maximum change in input due to the bridge offset and drift, which in the present illustrated embodiment is 10%. Resistive devices (R5) and (R6), 118 and 116 respectively, provide a DC offset to the amplifier 102 of one half (½) of the power supply voltage which is the middle of amplifier's 126 linear range under nominal conditions. The PCM 100 and amplifier/filter 102 provide a DC voltage proportional to the count placed in the PCM 100, just as the digital potentiometers of prior art systems provides a resistor divider output proportional to the digital value loaded into it. In practice reasonable nominal resistance and capacitive values are selected for the components and elements of this invention including those illustrated in FIG. 2 and their values can be identified by those of ordinary skill in the relevant arts. The employed values herein were selected as a matter of choice to provide the characteristics of 10 Hz 3 dB point on the filter with maximally flat group delay and a power supply voltage offset.

Figure 3B:
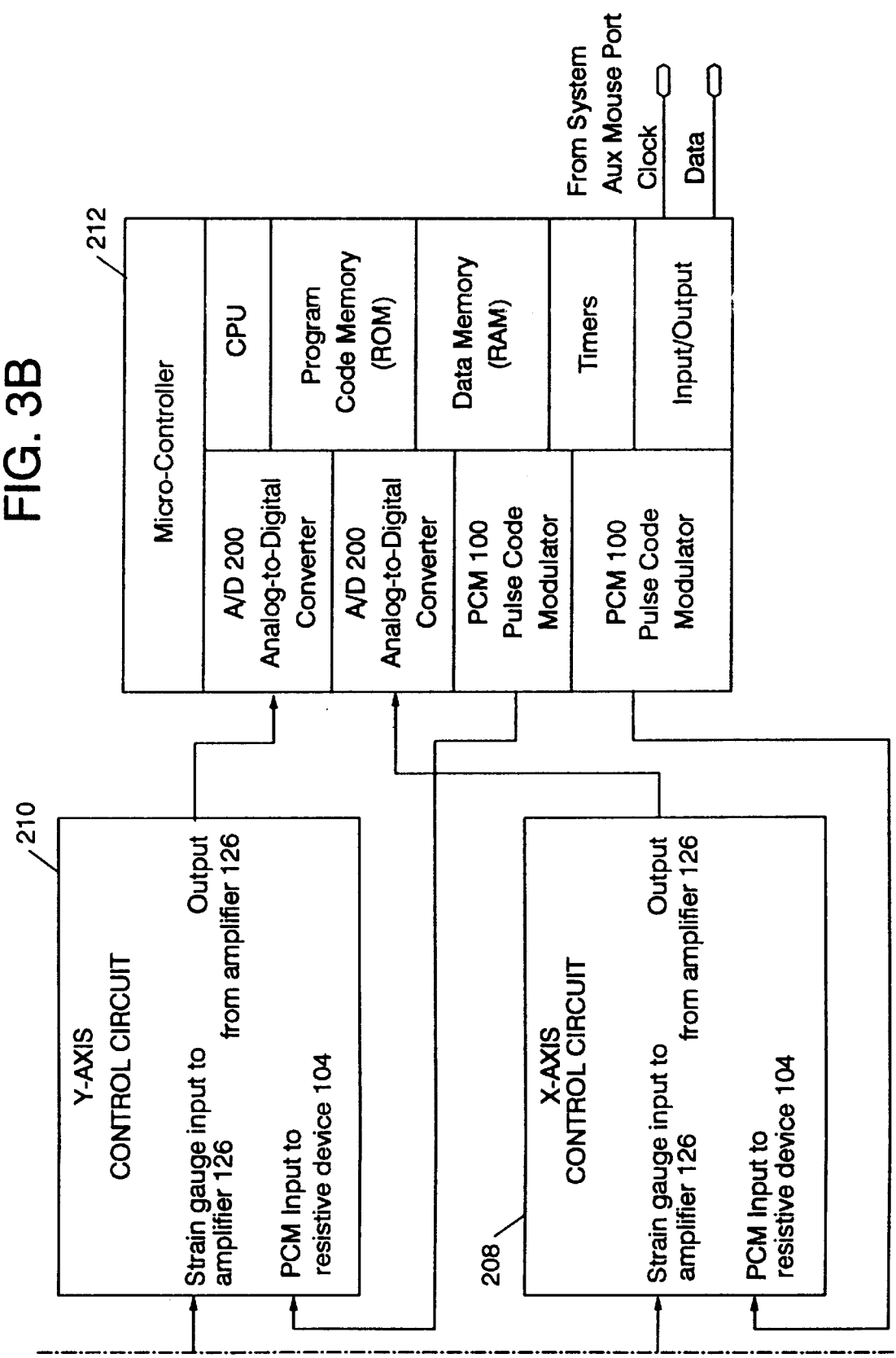
FIG. 3 is comprised of FIGS. 3A and 3B which illustrate a schematic block diagram of a computer system interfaced with a keyboard including a strain gauge and transducer for use with an illustrated schematic block diagram circuit for providing electrical signals for the X and Y axis of a monitor of the computer system such as illustrated in FIG. 1.

As stated hereinbefore there is illustrated in FIG. 3 a schematic block diagram of a computer system interfaced with a keyboard and circuits according to the principles of the present invention. In FIG. 3 there is provided in the FIG. 3A portion a strain gauge including a four gauge pointer stick assembly 202. The illustrated resistive elements are manipulated by a generally centralized control device 204. The resistive elements are connected via leads 1–6 which, through a connector 206, speed the generated signals on the STICK X and STICK Y lines to the respective X and Y-axis control circuits 208 and 210 of FIG. 3B. It will be appreciated that the block 212 of FIG. 3B presents a generalized view of certain features of the circuitry of FIG. 2, in addition to some principal components of the computer system of FIG. 1.

Referring to FIG. 2, the strain gauge bridge can be modeled as a simple voltage divider made up of resistive devices 122 and 124, R1 and R2 respectively.

Equations 1, 2, 3, and 4 provide a sensitivity analysis of the strain gauge components illustrated in FIG. 2. The "∫" is the symbol for the sensitivity algebraic operator and not for integration.

$$V\text{out} = \frac{R1}{R1+R2} Vc \quad \text{Equation 1)}$$

From Equation 1

$$\int_q^{V\text{out}} = \int_q^{\frac{R1}{R1+R2}Vc} = \quad \text{Equation 2)}$$

$$\int_q^{Vc} + \int_q^{R1} - \left[ \frac{R1}{R1+R2}\int_q^{R1} + \frac{R2}{R1+R2}\int_q^{R2} \right] =$$

$$\int_q^{Vc} + \frac{R2}{R1+R2}\left[ \int_q^{R1} - \int_q^{R2} \right]$$

Assuming that the Δ% is small and that the cross sensitivities are negligible $$\left( \text{i.e.} \int_{Vc}^{R1} = \int_{Vc}^{R2} = 0 \right), \text{ then:} \quad \text{Equation 3)}$$

$$\Delta\% V\text{out} \approx \Delta\% Vc + \frac{R2}{R1+R2}[\Delta\% R1 - \Delta\% R]$$

Since strain gauge resistive values for devices R1 and R2 are the same, it holds that:

$$\Delta\% V\text{out} \approx \Delta\% Vc + \frac{1}{2}[\Delta\% R1 - \Delta\% R2] = \quad \text{Equation 4)}$$

$$\Delta\% Vc + \frac{1}{2}\Delta\% R1 - \frac{1}{2}\Delta\%$$

From Equation 4) a +1% change in resistive value of R1, a –1% change in resistive value of R2, and a +1% change in voltage value Vc, yields a +2% change in Vout defined by Equation 2.

It will be shown that the calibration signal based on voltage value Vc cancels Vc from Equation 4). Therefore the calibration only accounts for the Δ% from the value of resistive devices R1 & R2, 122 and 124 respectively, which is the resistance from the strain gauge.

5). Assume that the $\Delta\% R1$ & $\Delta\% R2$ is $10\% => A = \frac{R9}{R7} = \cdot 100$ Then by assuming sufficiently large gain to approximate infinity the result is:

6). $\left( Vin - \frac{Vc}{2} \right)G7 = \left( \frac{Vc}{2} - Vout \right)G9 \Rightarrow$ $VinG7 = \frac{Vc}{2}(G7+G9) - VoutG9 \Rightarrow$ $Vout = \frac{\frac{Vc}{2}(G7+G9) - VoutG7}{G9} = \frac{Vc}{2}\left( \frac{G7}{G9}+1 \right) -$ $Vin\frac{G7}{G9} = \frac{Vc}{2}\left( \frac{R9}{R7}+1 \right) - Vin\frac{R9}{R7} \Rightarrow$ From 5). $\frac{R9}{R7} = .100 \Rightarrow$ 7). $Vout = \frac{Vc}{2}(1.1) - Vin(.1) = Vc\frac{11}{20} - \frac{Vin}{10}$ But $Vin = XVc$ where $X$ is a ratio of $Vc \Rightarrow$ 8). $\frac{Vout}{Vc} = \frac{11}{20} - \frac{X}{10}$ But $X = \frac{N}{1000}$.

(a percent of a count to 1,000, the counter maximum) = >

$\frac{Vout}{Vc} = \frac{11}{20} - \frac{N}{10000}$.

Where $N = 0$ to $1,000$

9). $Vout = Vc\left( \frac{11}{20} - \frac{N}{10000} \right)$.

For calibration referring again to FIG. 2, the output of the strain gauge can be viewed as some percentage of voltage value Vc, identified as voltage value VcP and the output of amplifier 102 can also be viewed as some percentage of Vc, identified as voltage value VcX. By letting the output of amplifier 126 to be value Y. Then:

10). $\frac{VcXR3 + YR4}{R4+R3} = VcP \Rightarrow$.

11). $Y = Vc\left( \left( 1 + \frac{R3}{R4} \right)P - \frac{R3}{R4}X \right) \Rightarrow$.

Taking two (2) samples at different counts in the PCM counter 100, it follows that:

12). $\dfrac{Y1}{Y2} = \dfrac{Vc\left(\left(1+\dfrac{R3}{R4}\right)P - \dfrac{R3}{R4}X1\right)}{Vc\left(\left(1+\dfrac{R3}{R4}\right)P - \dfrac{R3}{R4}X2\right)} \Rightarrow \left(1+\dfrac{R3}{R4}\right)Y1P - \dfrac{R3}{R4}Y1X2 =$ $\left(1+\dfrac{R3}{R4}\right)Y2P - \dfrac{R3}{R4}Y2X1 \Rightarrow.$ 13). $P = \dfrac{\dfrac{R3}{R4}(Y1X2 - Y2X1)}{\left(1+\dfrac{R3}{R4}\right)(Y1 - Y2)} = \dfrac{R3(Y1X2 - Y2X1)}{(R4 + R3)(Y1 - Y2)}.$ For calibration purposes it is desirable that Y=0 and with that substitution into equation 10), the result is:

14). $\dfrac{VcR3}{R3 + R4} = VcP \Rightarrow.$

15). $\dfrac{XR3}{R3 + R4} = P.$

By combining equations 13) and 15) the result is:

16). $\dfrac{XR3}{R3 + R4} = \dfrac{R3(Y1X2 - Y2X1)}{(R4 + R3)(Y1 - Y2)} \Rightarrow XR3 = \dfrac{R3(Y1X2 - Y2X1)}{(Y1 - Y2)} \Rightarrow$ $X = \dfrac{(Y1X2 - Y2X1)}{(Y1 - Y2)} \Rightarrow$ 17). $X = \dfrac{(Y1X2 - Y2X1)}{(Y1 - Y2)}$ But $X$, $X1$, and $X2$ are ratios of $Vc$ and the PCM Count $N$ Thereafter, substituting equation 9) into equation 17) yields:

18). $\dfrac{11}{20} - \dfrac{N}{10000} = \dfrac{Y1\left(\dfrac{11}{20} - \dfrac{N2}{10000}\right) - Y2\left(\dfrac{11}{20} - \dfrac{N1}{10000}\right)}{Y1 - Y2} =$ $\dfrac{\dfrac{11}{20}(Y1 - Y2) - \dfrac{Y1N2}{10000} + \dfrac{Y2N1}{10000}}{Y1 - Y2} = \dfrac{11}{20} + \dfrac{-\dfrac{Y1N2}{10000} + \dfrac{Y2N1}{10000}}{Y1 - Y2}$ In order to solve for N the 11/20 is subtracted out and both sides are multiplied by −10,000 which yields:

19) $N = \dfrac{Y1N2 - Y2N1}{Y1 - Y2}$

Where N1, Y1 are the count and output voltages, respectively, of the first sample; and N2, Y2 are the count and output voltages, respectively, of the second sample; and N is the count necessary to set the output voltage to 0.

It is therefore appreciated that at power up the controller will calibrate the transducer by setting the counter N to some value between 0 and 1000, as for example 625. The controller then reads the A/D and reads the strain gauge amplifier. Suppose, for example, it reads 6.1875 volts, the Controller then changes the value of the counter N to, say 572 and then rereads the A/D. Suppose, for example, it reads −1.736v. Applying equation 20.) it yields N=583.61204 or 583 since the counter N handles only integers. The controller then sets the counter N to 583 which sets the amplifier to the middle of its linear range.

What is claimed is:

1. A method of maintaining an operating point of a resistive strain gauge force calculating system within a personal computer which resistive strain gauge force calculating system includes resistive strain gauge elements for producing signals upon manual manipulation by an actuator, which signals are a function of a power supply voltage applied across the resistive strain gauge elements, and including a digital filtering circuit having a pulse modulation counter with an amplifier and resistive and capacitive network providing a delay filter to reduce non-linearity resulting from different pulse modulation counter counts, comprising the steps of:

generating signals across the resistive strain gauge in response to manual manipulation of the resistive strain gauge elements;

setting a count from zero to one thousand in the pulse modulation counter;

producing a fixed frequency digital signal in the pulse modulation counter where a ratio composed of up time and fixed period is proportional to the set count in the pulse modulation counter;

providing a direct current offset voltage to the amplifier equal to one half of the power supply voltage;

amplifying the fixed frequency digital signal from the pulse modulation counter and the direct current offset voltage to provide a direct current voltage proportional to the count set in the pulse modulation counter; and providing analog signals for conversion to digital signals to the analog to digital converter which signals are generated as a function of the signals generated across the resistive gauge elements and the direct current voltage proportional to the count set in the pulse modulation counter.

2. A control circuit for maintaining an operating point of a resistive strain gauge force calculating system within a personal computer, comprising:

a first subsystem circuit including a pulse code modulation counter, a first amplifier and a resistive and capacitive network filter for the first subsystem circuit to produce a direct current voltage proportional to a count in the pulse code modulation counter; and a second subsystem circuit having a voltage divider including a pair of resistive devices of equal value connected through a second amplifier having a nominal linear voltage range which is equal to a direct current voltage offset provided to the first amplifier.

3. A computer system comprising:

a central processing unit;

a display unit;

a keyboard having a plurality of keys, resistive strain gauges and a control actuator for applying an external force to the resistive strain gauges;

a strain gauge circuit, including a first subsystem circuit having a pulse code modulation counter providing a fixed frequency digital signal and a filtering network for the fixed frequency digital signal which filtering network includes a first amplifier and resistive and capacitive devices, and a second subsystem circuit having a voltage divider including resistive devices and a second amplifier, for providing analog signals in response to and as function of the external force applied to the resistive strain guages; and logic circuitry responsive to the analog signals provided in response to the external force applied to the resistive strain gauges.

4. The computer system, as defined in claim 3, wherein the first subsystem circuit produces a direct current voltage proportional to a count in the pulse code modulation counter, and the resistive devices of the first subsystem circuit includes a pair of resistive devices which are of equal value and are connected to the first amplifier and provide a direct current voltage offset to first amplifier which offset value is nominally the middle of the linear voltage range of the second amplifier of the second subsystem circuit and form a filter selected to reduce the non-linearity resulting from different counts applied to the PCM counter.

5. A computer system comprising:
   a central processing unit;
   a display unit;
   a keyboard having a plurality of keys, resistive strain gauges and a control actuator for receiving an external force applied to the resistive strain gauges;
   a first circuit including a pulse code modulation counter, a first amplifier and a resistive and capacitive network forming a filter to produce a direct current voltage proportional to a count in the pulse code modulation counter; and
   a second circuit responsive to the external force applied to the resistive strain gauges having a voltage divider including a pair of resistive devices of equal value connected through a second amplifier having a nominal linear voltage range which is equal to a direct current voltage offset provided to the first amplifier by the resistive and capacitive network of the first circuit which is connected to the resistive and capacitive network of the second circuit.

* * * * *